(No Model.) 3 Sheets—Sheet 1.

L. EHRLICH.
CASH REGISTER AND INDICATOR.

No. 388,030. Patented Aug. 21, 1888.

WITNESSES:
S. L. Schrader
J. Hornsby

INVENTOR:
Leo Ehrlich by
Paul Bakewell,
his attorney.

(No Model.) 3 Sheets—Sheet 2.

L. EHRLICH.
CASH REGISTER AND INDICATOR.

No. 388,030. Patented Aug. 21, 1888.

WITNESSES.
S. L. Schrader
[signature]

INVENTOR.
Leo Ehrlich
Paul Bakewell
his attorney.

(No Model.) 3 Sheets—Sheet 3.

L. EHRLICH.
CASH REGISTER AND INDICATOR.

No. 388,030. Patented Aug. 21, 1888.

WITNESSES.
S. L. Schrader.
J. L. Hornsby.

INVENTOR
Leo Ehrlich by
Paul Bakewell,
his attorney.

UNITED STATES PATENT OFFICE.

LEO EHRLICH, OF ST. LOUIS, MISSOURI.

CASH REGISTER AND INDICATOR.

SPECIFICATION forming part of Letters Patent No. 388,030, dated August 21, 1888.

Application filed October 5, 1887. Serial No. 251,509. (No model.)

*To all whom it may concern:*

Be it known that I, LEO EHRLICH, a citizen of the United States, residing in the city of St. Louis, State of Missouri, have invented a certain new and useful Improvement in Cash Registers and Indicators, of which the following is a full, clear, and exact description.

My invention relates to improvements in cash registers and indicators used for registering and indicating the various cash amounts received in saloons, stores, and other places for any given period of time, and is particularly applicable to that class of apparatus wherein is found a series of pivoted key-levers, each of which represents a certain number or cash value, and is combined with registering-gear and with a tablet bearing the same number or value to that of the key, so that on depressing any key-lever the cash receipt represented thereby is immediately registered and the tablet of the key exposed to view until another key is operated, when the first tablet disappears from sight and the second tablet is exposed, and so on.

The object of my invention is to effect, by one set or series of wheels, a consecutive and collective registration of the several cash receipts for the entire series of key-levers, thereby enabling the total amount received to be ascertained at a glance without the necessity of adding the separate collective registrations for each key-lever to arrive at the total, as in ordinary machines, and to insure a quicker action of the indicating-tablets in dropping from view.

Figure 1:
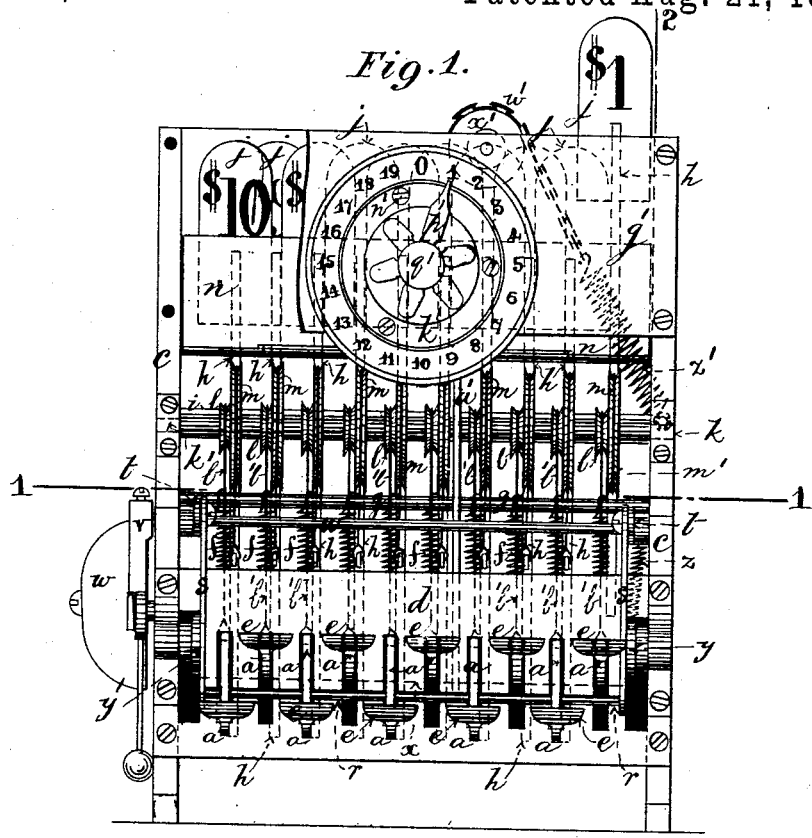
Figure 2:
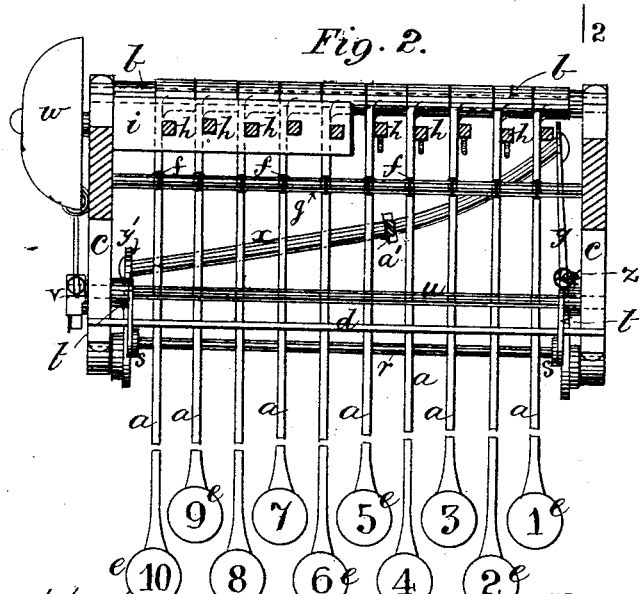
Figure 3:
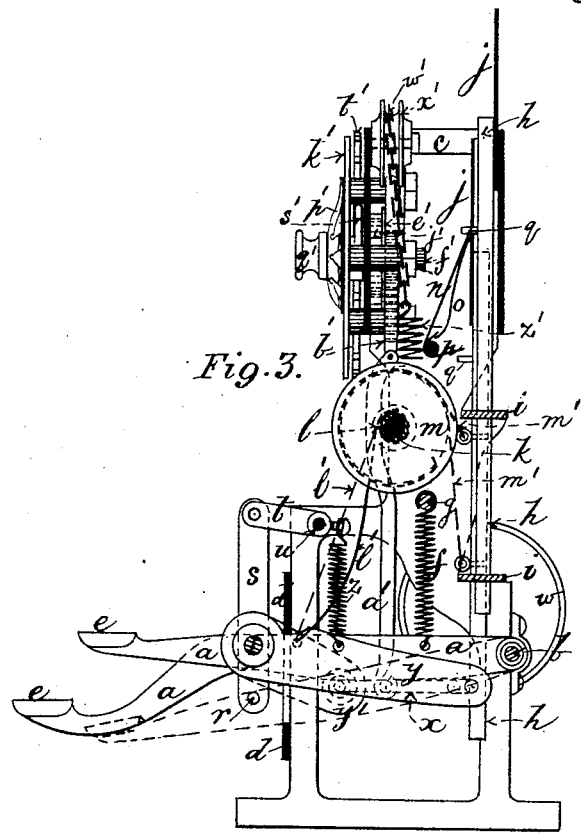
Figure 4:
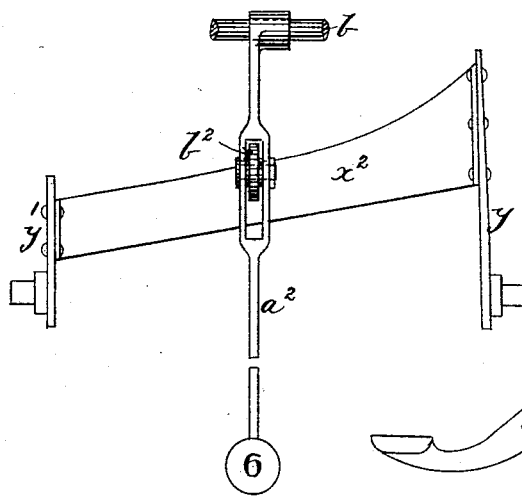
Figure 5:
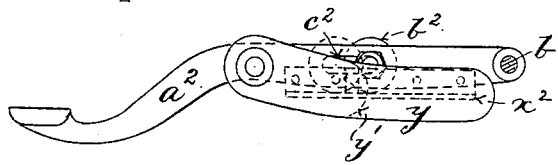
Figure 6:
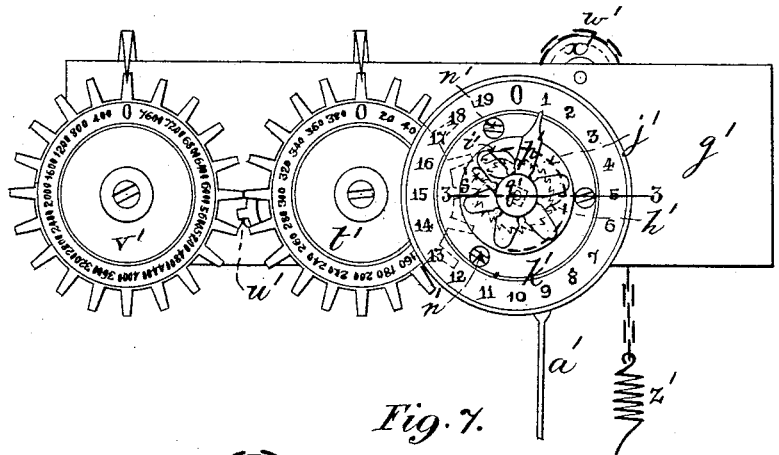
Figure 7:
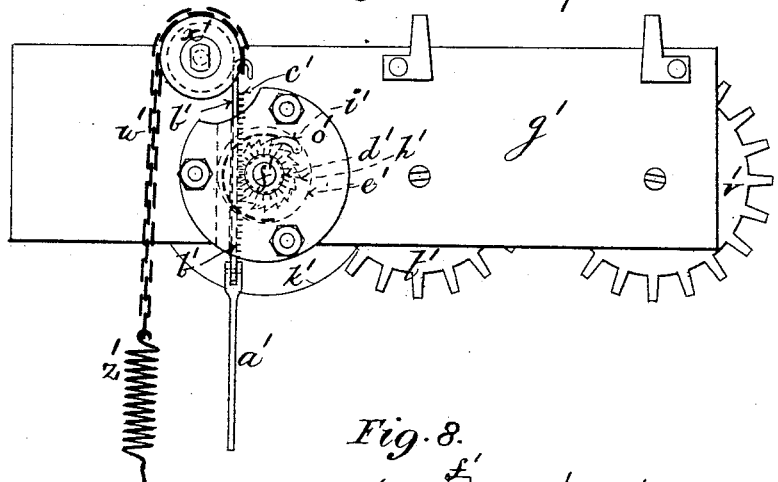
Figure 8:
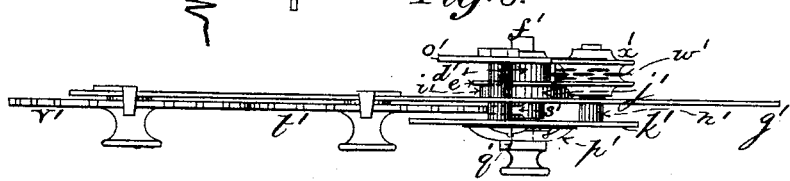
Figure 9:
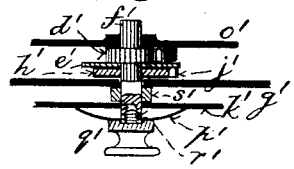

On the accompanying drawings, Figure 1 is a front elevation of my improved cash register and indicator, with the registering mechanism broken away; Fig. 2, a sectional plan of the same on line 1 1 in Fig. 1; Fig. 3, a transverse section on line 2 2 in Fig. 1; Figs. 4 and 5, plan and side elevations, respectively, of modified parts of Figs. 1, 2, and 3; Figs. 6 and 7, detached front and rear elevations of the registering devices; Fig. 8, a plan of the same; and Fig. 9 a sectional plan of parts thereof, following line 3 3 in Fig. 6.

Like letters of reference denote like parts in the respective figures.

$a$ $a$ represent a series of key-levers, of the second kind, arranged parallel to one another and fulcrumed loosely at their rear ends on the spindle $b$, which extends horizontally between and is carried at its ends by the sides $c$ of the machine. Each key-lever $a$ projects forward from its fulcrum $b$ through a slotted plate, $d$, at the front of the machine, and terminates at a suitable distance therefrom in a button, $e$, bearing a certain number or cash value. The buttons $e$ in the present case are arranged by curving downward the front portion of every alternate key-lever $a$ in an upper and lower bank in the usual way, and are numbered from one to ten dollars, as shown in Fig. 2.

$f f$ are spiral springs connecting the key-levers $a$ with a fixed overhead cross-bar, $g$, for normally retaining the key-levers $a$ in line transversely with each other. At the back of the machine, corresponding in number with the key-levers $a$ and contiguous thereto, respectively are arranged vertical rods $h$, which work through horizontal guide-bars $i$, fixed across the machine. Each rod $h$ carries at its upper end a tablet, $j$, which bears the same number or cash value on its face as that on the front end of its corresponding key-lever, $a$, the rods $h$, with their tablets $j$, being normally in such position that the latter remain hidden from view within the casing (not shown) of the machine.

On a spindle, $k$, which extends horizontally between the sides $c$ of the machine in front of the vertical rods $h$, are mounted loosely a series of double sheaves or pulleys, $l$ $m$, corresponding in number to the key-levers $a$, and each composed of a small sheave, $l$, located immediately over a key-lever $a$, and a large sheave, $m$, facing the corresponding vertical rod, $h$, the two sheaves $l$ $m$ being in one piece or attached together side by side. Around the sheave $l$ is wound a cord or chain, $l'$, which connects with the key-lever $a$, and around the sheave $m$ is a cord or chain, $m'$, which connects with the lower part of the vertical rod $h$.

Above the sheaves $l$ $m$, in front of and bearing against the vertical rods $h$, is the upper edge of a wing, $n$, which inclines downward and forward to its lower edge, where it is hinged at the ends to the sides $c$ of the machine. The wing $n$ may be retained normally in this position by any suitable spring, such as $o$, and is formed with a bottom web or flange, $p$, which projects backward from the hinges of the wing $n$ toward the vertical rods $h$, so as to overhang or be in the vertical path of pins or studs $q$, projecting from the front sides of the vertical rods $h$.

Below the entire series of key-levers $a$, in front of the slotted plate $d$, is arranged a transverse bar, $r$, which is attached at its ends to vertical hanging links $s$, combined with arms $t$ and spindle $u$, on one end of which is a tappet-lever, $v$, for operating a gong or bell, $w$; but these parts, being of ordinary well-known construction, need no further description.

The mode of operating the above-described parts, which relates to the indicating features of my machine, is thus described: On depressing any one of the key-levers $a$ by its button $e$, bearing the number corresponding with the cash amount paid, the vibration of the key-lever $a$ on its fulcrum $b$ pulls upon the cord $l'$, so as to partially rotate the small sheave $l$ and with it the large sheave $m$, which, hauling on its cord $m'$, raises the vertical rod $h$, carrying the tablet $j$, which bears the same number as that on the key-lever $a$, and the said tablet $j$ thereby appears to view, either above the back of the machine or through a glazed opening therein, as desired. During the ascent of the vertical rod $h$ its projecting pin or stud $q$, in passing the upper edge of the inclined wing $n$, pushes the latter forward until clear of its upper edge, when the wing $n$ falls or springs back to its normal position, its upper edge being now below the pin or stud $q$. Simultaneously the key-lever $a$ strikes and depresses the transverse bar $r$ in front of the machine, and the bell or gong $w$ is thereby sounded. On releasing the key-lever $a$, the elevated vertical rod $h$ is prevented from falling to its original position by the pin or stud $q$, which is caught by and rests upon the upper edge of the wing $n$, and the indicating-tablet $j$ thereby remains exposed to view until, on depressing another key-lever $a$, the wing $n$ is again pushed forward, and so allows the first raised rod $h$, with its tablet $j$, to drop out of sight. This release of the first-raised tablet-rod is rendered instantaneous on commencing to depress the second key-lever $a$, in consequence of the pin or stud $q$ of the second vertical rod $h$, as the latter is rising, striking and passing the bottom web or flange, $p$, of the wing $n$, the latter being thereby pushed away from the rods $h$ and from under the stud $q$ of the rod first raised, and allowing the exposed tablet $j$ to drop out of sight before the second tablet appears in view, which is an advantage for avoiding any mistake in reading the last-raised tablet $j$.

I will now proceed to describe that part of my invention which relates to the registering mechanism.

Beneath and normally in contact with the under edge of each key-lever $a$, at points intermediate to the fulcrum $b$ and slotted front plate, $d$, is arranged transversely a bar, $x$, which is specially shaped or curved horizontally and secured at its ends to the inner ends, respectively, of two levers, $y\ y'$, which are fulcrumed to the sides $c$ of the machine at or near the slotted front plate, $d$, and constrained by a spring, $z$, connecting the lever $y$ with any convenient part of the mechanism, so that the bar $x$ is retained in its normal position against the entire series of key-levers $a$, as before named.

The bar $x$ is so mounted that it will move bodily, or rather so that both of its ends will move simultaneously, when any key-lever is struck. The structure presents in effect a compound bar or lever of enlarged dimensions, its width forming a bearing for the contact-points of the key-levers, and its length extending in the same direction as said key-levers, said contact-points being distributed along the length of said compound bar toward the fulcra of said levers, whereby a long range of key-levers may be employed without an increase in width of the frame or box of the register apparatus, since they may be of little thickness and may be placed close together, a result not believed to have been heretofore attained, and, moreover, in a practical embodiment thereof the distance apart of the several key-levers will not affect the length of the compound lever.

To the bar $x$, midway between its ends or thereabout, is hooked or otherwise jointed the lower end of a rod, $a'$, which is jointed at its upper end to one end of a bar, $b'$, which is formed on one side with a toothed rack, $c'$, gearing into a toothed wheel, $d'$, having a flange, $e'$, on one side, and mounted loosely on a spindle, $f'$, which passes through a plate, $g'$, secured to the front of the machine, as seen in Figs. 1 and 3, for carrying the various registering-wheels. On the spindle $f'$, between the flange $e'$ of the toothed wheel $d'$ and the plate $g'$, is fixed a ratchet-wheel, $h'$, with which engages a pawl, $i'$, pivoted to the flange $e'$ and kept in gear with the ratchet-wheel $h'$ by a spring, $j'$, which is secured at one end to the flange $e'$, and, passing partially round the ratchet-wheel $h'$, bears at its free end against the pawl $i'$, as seen in dotted lines, Figs. 6 and 7. The spindle $f'$ on the front side of the plate $g'$ is made square and passes through a clearance-hole in the center of the primal registering-disk $k'$, which is rigidly attached to the front side of the plate $g'$, at a suitable distance therefrom, by screws $n'$, which also serve to secure to the plate $g'$ the back or cover plate $o'$, between which and the plate $g'$ the toothed wheel $d'$ with its pawl $i'$, ratchet-wheel $h'$, and toothed rack-bar $b'$ are located and operate.

The square end of the spindle $f'$ in front of the primal disk $k'$ carries a star-shaped spring index-hand, $p'$, which is pressed with more or less frictional contact against the face of the disk $k'$ by the head $q'$ of a set-screw, $r'$, which is screwed into the end of the spindle $f'$ and secures the index-hand $p'$ thereon.

On the spindle $f'$, between the fixed primal disk $k'$ and the plate $g'$, is fixed a detent or catch, $s'$, in such a position relatively with the pointer of the index-hand $p'$ that, on a complete revolution of the latter by the spindle $f'$ from and to the zero-mark on the primal dial, the detent or catch $s'$ engages with one of the teeth of the second registering-wheel $t'$ and rotates the latter through a space equal to one tooth or division on its face. In like manner, on a complete revolution of the second wheel $t'$, a detent or catch, $u'$, thereon engages with a tooth of the third wheel $v'$ and rotates this wheel to the extent of one tooth or division on its face, and so on throughout any number of registering-wheels.

The primal disk $k'$ in the present instance has twenty equal radial divisions on its face, which are numbered by increments of one from one to twenty dollars. The second wheel $t'$ has twenty equal divisions, numbered by increments of twenty from twenty to four hundred dollars, and the third wheel $v'$ twenty divisions, numbered by increments of four hundred from four hundred to eight thousand dollars; but the numbering and ratios of increments may be varied at pleasure.

Connected with the upper end of the toothed rack-bar $b'$ is a chain or cord, $w'$, which passes over an overhead pulley, $x'$, and is secured at its other end by an intermediate spring, $z'$, to the side $c$ or any other convenient fixed part of the machine.

The operation of the registering mechanism described is as follows: On depressing any key-lever, $a$—say that numbered five, representing five dollars—the vibration thereof on its fulcrum $b$ depresses the bar $x$ beneath the key-levers, which causes the rod $a'$ to pull down the toothed rack-bar $b'$, thereby partially rotating the toothed wheel $d'$, and this in turn, by its pawl $i'$, rotates the ratchet-wheel $h'$, spindle $f'$, and index-hand $p'$ to a corresponding extent, which must be such that the pointer of the index-hand $p'$ traverses five of the numbered divisions on the primal disk $k'$, or from the zero-mark to the figure five, thus registering five dollars. On releasing the key-lever $a$, the bar $x$ is returned to its normal position by the spring $z$, and in so doing the rod $a'$ raises the toothed rack-bar $b'$, which partially rotates the toothed wheel $d'$ in the opposite direction, its pawl $i'$ meanwhile riding over, without affecting the ratchet-wheel $h'$ and spindle $f'$, ready for a fresh operation, this movement of the parts being assisted and rendered more positive by the chain $w'$. In rotating the spindle $f'$, when registering, as described, its momentum is checked and the index-hand $p'$ thereby prevented from traveling too far by the friction induced between the index-hand $p'$ and the face of the disk $k'$, this friction being regulated at pleasure by tightening or loosening the set-screw $r'$.

In operating my machine the depression of each key-lever $a$ at its front end or button $e$ is constant, whence it is evident that the vibrations of the key-levers $a$ at their respective points of contact with the bar $x$ must be variable in the ratio of from one to ten for enabling the bar $x$ to pull down the rod $a'$ and toothed rack $b'$, so as to rotate the pointer of the index-hand $p'$ through variable arcs corresponding in length to from one to ten numbered divisions on the primal disk $k'$. In other words, for registering one dollar the bar $x$ must be in contact with the key-lever $a$ marked one, at such a distance from the fulcrum $b$ that the depression of this key-lever will vibrate the bar $x$ through a space equal to the arc of rotation given to the toothed wheel $d'$ necessary to rotate the pointer of the index-hand $p'$ through one division of the dial; and again for registering ten dollars the bar $x$ must be in contact with the key-lever marked ten at such a farther distance from the fulcrum $b$ that the depression or vibration of the bar $x$ will insure an amount of rotation to the toothed wheel $d'$ equal to that needed for causing the pointer of the index-hand $p'$ to traverse ten divisions on the dial, and so on for the intermediate key-levers $a$. Hence it follows that the bar $x$ must be set to the particular shape or curvature to fulfill these requirements throughout the entire series of key-levers. If preferred, I may substitute for this bar $x$ a broad flat bar, $x^2$, as seen in Figs. 4 and 5, and provide each key-lever $a^2$ with a roller, $b^2$, or other contacting device, which, by means of horizontal slots $c^2$ along the lever, can be moved nearer to or farther from the fulcrum $b$, so that the point of contact between the bar $x^2$ and the lever $a^2$ can in this way be adjusted without altering the shape of the bar, and the extent of movement of the bar and the mechanism actuated thereby may be varied to a nicety. The levers $y$ and $y'$ are provided with springs, (not shown,) similar to the springs $f$ and $z$, as in Figs. 1, 2, and 3, which will be of great advantage in cases where it is desired to alter the numbering of the keys and divisions on the dials or to vary the relative positions of the key-levers.

I claim—

1. The combination, with a series of pivoted key-levers, $a$, having springs $f$, of a bar, $x$, carried by pivoted levers $y$ $y'$, extending in the same direction as said key-levers, having spring $z$, connecting-rod $a'$, toothed rack $b'$, engaging with toothed wheel $d'$, having pawl $i'$, engaging with ratchet-wheel $h'$, fixed to spindle $f'$, index-hand $p'$, and primal disk $k'$, marked with divisions on its face, substantially as and for the purpose described.

2. The combination, with a series of pivoted key-levers $a^2$, having springs $f$ and adjustable rollers $b^2$, of a bar, $x^2$, carried by levers $y$ $y'$, having springs $z$, connecting-rod $a'$, toothed rack $b'$, engaging with toothed wheel $d'$, having pawl $i'$, engaging with ratchet-wheel $h'$, fixed to spindle $f'$, index-hand $p'$, and primal disk $k'$, marked with divisions on its face, substantially as and for the purpose described.

3. The combination, with a key-lever and a vertical rod adapted to display an indicating-tablet, of a compound sheave composed of two pulleys of different diameters secured to move together and have connections with the key-lever and with the vertical rod, whereby a varied range of movement of the key-lever and vertical rod is obtained, substantially as described.

4. The combination, with two or more pivoted key-levers *a* and vertical rods *h*, carrying indicating-tablets *j*, and having projecting pins or studs *q*, of compound sheaves or pulleys *l m*, spindle *k*, cords or chains *l' m'*, and hinged wing *n*, substantially as described.

5. The combination, with two or more vertical rods, *h*, carrying indicating-tablets *j*, and having projecting pins or studs *q*, and with means for raising the rods vertically, of a hinged wing, *n*, adapted to engage with said pins when the rods are raised, and formed with a bottom web or flange, *p*, substantially as described.

6. In a cash register and indicator, the combination, with a series of key-levers, of a graduating compound bar adapted to be actuated by and extending in the same direction as said key-levers, and having a pivot or hinge the axis of which extends in the direction of the width of the bar, substantially as described.

7. In a cash register and indicator, the combination, with a plurality of key-levers, of a graduating compound bar adapted to be actuated by and extending in the same direction as said key-levers, and having a pivot or hinge the axis of which extends in the direction of the width of the bar, a rotatable wheel connected with the registering mechanism, and direct connections between said wheel and graduating-bar to rotate the former, substantially as described.

8. In a cash register and indicator, the combination, with a plurality of key-levers, each provided with a contacting device or roller adapted to be adjusted to and from the fulcrum of the lever, of a pivoted bar adapted to be contacted by said contacting device to be actuated thereby, substantially as described.

9. The combination, with a plurality of key-levers, of a pivoted compound bar adapted to be contacted by the levers and extending in the same direction as said levers, substantially as described.

In testimony whereof I affix my signature, in presence of two witnesses, this 29th day of September, 1887.

LEO EHRLICH.

Witnesses:
S. L. SCHRADER,
PAUL BAKEWELL.